United States Patent
Wan et al.

(10) Patent No.: US 9,143,993 B2
(45) Date of Patent: Sep. 22, 2015

(54) METHOD FOR OPTIMIZING NEIGHBORING CELL, BASE STATION AND SYSTEM

(71) Applicant: HUAWEI TECHNOLOGIES CO., LTD., Shenzhen, Guangdong (CN)

(72) Inventors: Rong Wan, Chengdu (CN); Jianzhong Huang, Shenzhen (CN); Yanming Chen, Shenzhen (CN); Lang He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 14/098,688

(22) Filed: Dec. 6, 2013

(65) Prior Publication Data

US 2014/0099961 A1    Apr. 10, 2014

Related U.S. Application Data

(63) Continuation of application No. PCT/CN2011/075379, filed on Jun. 7, 2011.

(51) Int. Cl.
*H04W 36/00* (2009.01)
*H04W 16/32* (2009.01)
*H04W 24/02* (2009.01)

(52) U.S. Cl.
CPC .......... *H04W 36/0061* (2013.01); *H04W 16/32* (2013.01); *H04W 24/02* (2013.01); *H04W 36/0083* (2013.01)

(58) Field of Classification Search
CPC .................... H04W 36/0061; H04W 36/0083; H04W 16/32; H04W 24/02
USPC .......................... 455/438, 436, 437, 443, 449
See application file for complete search history.

(56) References Cited

U.S. PATENT DOCUMENTS

2005/0288017 A1    12/2005    Doumenc et al.
2009/0316652 A1    12/2009    Agashe et al.
(Continued)

FOREIGN PATENT DOCUMENTS

CN    1713774    12/2005
CN    1984459    6/2007
(Continued)

OTHER PUBLICATIONS

Neighbor Cell Relation List and Physical Cell Identity Seft-Organization in LTE, (Mehdi Amirijoo, Pal Frenger, Fredrik Gunnarsson, Harald Kallin, Johan Moe, Kristina Zetterberg), Ericsson Research, Ericsson AB, Sweden, 2008.*
(Continued)

*Primary Examiner* — Khai M Nguyen
(74) *Attorney, Agent, or Firm* — Staas & Halsey LLP

(57) ABSTRACT

Embodiments of the present invention provide a method for optimizing a neighboring cell, a base station, and a system. The method includes: detecting, by the base station corresponding to the second cell, that a terminal in the second cell reports an unidentified physical identifier PCI; and obtaining a global cell identity GCI corresponding to the unidentified PCI, and determining that a cell corresponding to the GCI is an un-configured neighboring cell of the first cell; and sending, by the base station corresponding to the second cell, information about the un-configured neighboring cell to a base station BSS or an operations support system OSS, which is corresponding to the first cell, so that the BSS or OSS obtains the un-configured neighboring cell of the first cell according to the information of the un-configured neighboring cell, and adds the un-configured neighboring cell to a neighboring cell list of the first cell.

5 Claims, 3 Drawing Sheets

(56) References Cited

U.S. PATENT DOCUMENTS

| | | | |
|---|---|---|---|
| 2010/0178912 A1 | 7/2010 | Gunnarsson et al. | |
| 2010/0317357 A1 | 12/2010 | Miki et al. | |
| 2011/0098046 A1 | 4/2011 | Shin | |

FOREIGN PATENT DOCUMENTS

| | | |
|---|---|---|
| CN | 101001471 | 7/2007 |
| CN | 101137125 | 3/2008 |
| CN | 101453725 A | 6/2009 |
| CN | 101489210 | 7/2009 |
| CN | 101511093 A | 8/2009 |
| CN | 102045749 | 5/2011 |
| JP | 2013-502749 | 1/2013 |
| WO | 2004/114714 | 12/2004 |
| WO | 2009/057782 A1 | 5/2009 |
| WO | 2011/021593 A1 | 2/2011 |

OTHER PUBLICATIONS

Extended European Search Report dated Mar. 3, 2014 in corresponding European Patent Application 11786147.6.

International Search Report and Written Opinion of the International Searching Authority issued Mar. 22, 2012 in corresponding International Patent Application No. PCT/CN2011/075382.

International Search Report and Written Opinion of the International Searching Authority issued Mar. 29, 2012 in corresponding International Patent Application No. PCT/CN2011/075379.

"Neighbor Cell Relation List and Physical Cell Identity Self-Organization in LTE", Mehdi Amirijoo et al, Wireless Access Networks, Ericsson Research, Ericsson AB, Sweden, 2008, pp. 37-41.

"Neighbor Cell Relation List and Measured Cell Identity Management in LTE", Mehdi Amirijoo et al, Wireless Access Networks, Ericsson Research, Ericsson AB, Sweden, 2008, pp. 152-159.

"Evaluations of LTE Automatic Neighbor Relations", Dahlèn et al, of TeliaSonera in Stockholm, Sweden and Ericsson Research in Linköping/Stockholm, Sweden, 2011, 5 pages.

Japanese Office Action dated Dec. 2, 2014 in corresponding Japanese Patent Application No. 2014-513877.

Chinese Office Action issued on Oct. 8, 2014 in corresponding Chinese Patent Application No. 201180001144.3.

* cited by examiner

METHOD FOR OPTIMIZING NEIGHBORING CELL, BASE STATION AND SYSTEM

CROSS-REFERENCE TO RELATED APPLICATIONS

This application is a continuation of International Application No. PCT/CN2011/075379, filed on 7 Jun. 2011, which is hereby incorporated by reference in its entirety.

TECHNICAL FIELD

The present invention relates to the field of communications technologies, and in particular, to a method for optimizing a neighboring cell, a base station, and a system.

BACKGROUND

In a CDMA (Code Division Multiple Access, Code Division Multiple Access) system, in order to ensure normal communication, when a mobile phone terminal moves from a coverage area of one cell to a coverage area of another cell, a handoff between the cells needs to be performed. During the handoff, a search scope and a handoff direction of the mobile phone are determined by neighboring cell lists of the cells. If a neighboring cell is not configured or is configured with an improper priority, network performance will be affected. In addition, redundant neighboring cell configuration may affect time for a mobile station to search for a pilot frequency. Therefore, proper neighboring cell optimization is an important issue that needs to be solved for CDMA. At present, large-scale neighboring cell optimization for CDMA is mostly completed by manually operating a background neighboring cell optimization tool. Specifically, a CDMA base station subsystem, after detecting an unidentified CDMA PN (Pseudo Noise, mobile short code), sends the PN to a neighboring cell optimization tool; and with manual operations, the neighboring cell optimization tool analyzes the PN, determines whether a cell where the PN is located is an un-configured neighboring cell, and if the cell is an un-configured neighboring cell, notifies the CDMA base station subsystem of the un-configured neighboring cell, so that the CDMA base station subsystem updates a neighboring cell optimization list according to the un-configured neighboring cell.

After analyzing the prior art, the inventor finds that the prior art has at least the following disadvantage: after being detected by a CDMA base station subsystem, an unidentified PN can be processed only by manually operating a background neighboring cell optimization tool, and as a result, large-scale neighboring cell optimization is always completed by using a background neighboring cell optimization tool, where a data source for processing is large-sized and an efficiency of the tool is low.

SUMMARY

In order to solve the problem in the prior art, embodiments of the present invention provide a method for optimizing a neighboring cell, a base station, and a system. The technical solution is as follows.

In one aspect, a method for optimizing a neighboring cell is provided, where a first network and a second network are in overlay networking, where a first cell in the first network and a second cell in the second network have a coverage area in common and a base station corresponding to the first cell is different from a base station corresponding to the second cell, and the method includes:

detecting, by the base station corresponding to the second cell, that a terminal in the second cell reports an unidentified physical identifier PCI;

obtaining, by the base station corresponding to the second cell, a global cell identity GCI corresponding to the unidentified PCI, and determining that a cell corresponding to the GCI is an un-configured neighboring cell of the first cell; and sending, by the base station corresponding to the second cell, information about the un-configured neighboring cell to a base station BSS or an operations support system OSS, which is corresponding to the first cell, so that the BSS or OSS obtains the un-configured neighboring cell of the first cell according to the information about the un-configured neighboring cell, and adds the un-configured neighboring cell to a neighboring cell list of the first cell.

In another aspect, a base station is provided, where a first network and a second network are in overlay networking, where a first cell in the first network and a second cell in the second network have a coverage area in common and a base station corresponding to the first cell is different from a base station corresponding to the second cell, the base station is the base station corresponding to the second cell, and the base station includes:

a detecting module, configured to detect that a terminal in the second cell reports an unidentified physical identifier PCI;

an obtaining module, configured to obtain a global cell identity GCI corresponding to the unidentified PCI, and determine that a cell corresponding to the GCI is an un-configured neighboring cell of the first cell; and a transmit module, configured to send information about the un-configured neighboring cell to a base station subsystem BSS or an operations support system OSS, which is corresponding to the first cell, so that the BSS or OSS obtains the un-configured neighboring cell of the first cell according to the information about the un-configured neighboring cell, and adds the un-configured neighboring cell to a neighboring cell list of the first cell.

In another aspect, a system for optimizing a neighboring cell is also provided, including a first base station and a second base station, where a first network and a second network are in overlay networking, where a first cell in the first network and a second cell in the second network have a coverage area in common, a base station corresponding to the first cell is the first base station, and a base station corresponding to the second cell is the second base station;

the second base station is configured to detect that a terminal in the second cell reports an unidentified physical identifier PCI; obtain a global cell identity GCI corresponding to the unidentified PCI, and determine that a cell corresponding to the GCI is an un-configured neighboring cell of the first cell; and send information about the un-configured neighboring cell to a first base station subsystem BSS; and the first base station is configured to receive the information about the un-configured neighboring cell sent by the second base station; obtain the un-configured neighboring cell of the first cell according to the information about the un-configured neighboring cell; and add the un-configured neighboring cell to a neighboring cell list of the first cell.

In one aspect, a method for optimizing a neighboring cell is provided, where a first network and a second network are in overlay networking, where a first cell in the first network and a second cell in the second network have a coverage area in common and the first cell and the second cell share one base station, and the method includes:

detecting, by the base station, that a terminal in the second cell reports an unidentified physical identifier;

obtaining a global cell identity GCI corresponding to the unidentified physical identifier, and determining that a cell corresponding to the GCI is an un-configured neighboring cell of the first cell; and obtaining the un-configured neighboring cell of the first cell according to information about the un-configured neighboring cell, and adding the un-configured neighboring cell to a neighboring cell list of the first cell.

In another aspect, a base station is further provided, where a first network and a second network are in overlay networking, where a first cell in the first network and a second cell in the second network have a coverage area in common; the base station is a base station shared by the first cell and the second cell; and the base station includes:

a detecting module, configured to detect that a terminal in the second cell reports an unidentified physical identifier;

an obtaining module, configured to obtain a global cell identity GCI corresponding to the unidentified physical identifier PN, and determine that a cell corresponding to the GCI is an un-configured neighboring cell of the first cell; and an adding module, configured to obtain the un-configured neighboring cell of the first cell according to information about the un-configured neighboring cell, and add the un-configured neighboring cell to the neighboring cell list of the first cell.

A benefit of the technical solution of the embodiments of the present invention is that: in cases where a first network and a second network are in overlay networking, the second network is used to help the first network to detect a problem that a neighboring cell is not configured, thereby implementing automatic neighboring cell optimization for a cell in the first network, which reduces manpower costs of network optimization.

DESCRIPTION OF EMBODIMENTS

Figure 1:
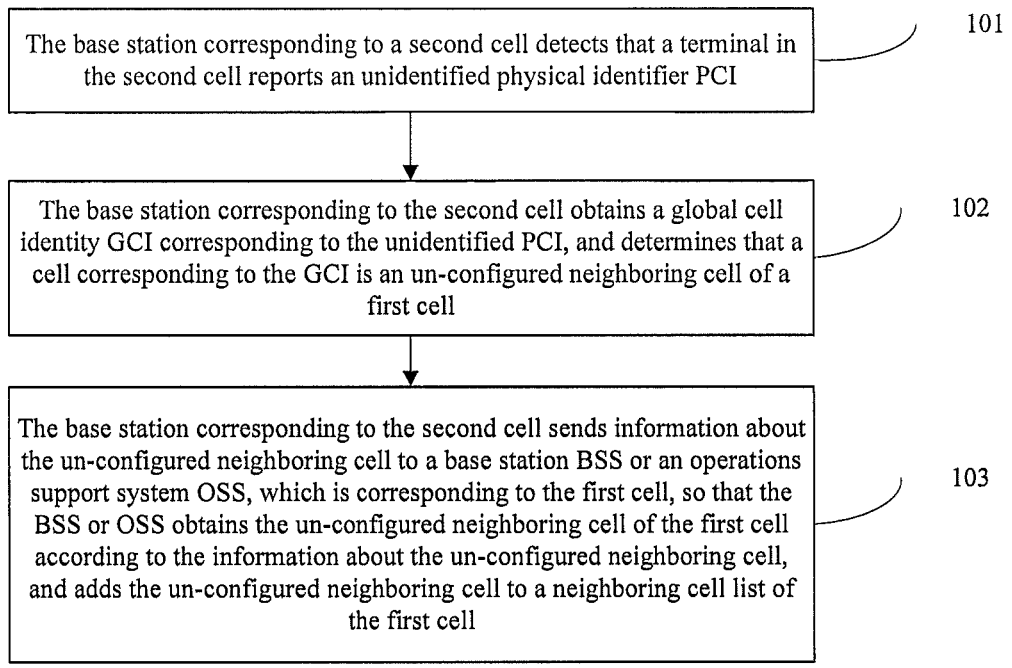
FIG. 1 is a flowchart of a method for optimizing a neighboring cell according to an embodiment of the present invention.

To make the objectives, technical solutions, and advantages of the present invention more comprehensible, the following further describes the embodiments of the present invention in detail with reference to the accompanying drawings Referring to FIG. 1, an embodiment of the present invention provides a method for optimizing a neighboring cell, where a first network and a second network are in overlay networking, where a first cell in the first network and a second cell in the second network have a coverage area in common, and a base station corresponding to the first cell is different from a base station corresponding to the second cell. The method includes:

Step 101: The base station corresponding to the second cell detects that a terminal in the second cell reports an unidentified physical identifier PCI;

Step 102: The base station corresponding to the second cell obtains a global cell identity GCI corresponding to the unidentified PCI, and determines that a cell corresponding to the GCI is an un-configured neighboring cell of the first cell; and Step 103: The base station corresponding to the second cell sends information about the un-configured neighboring cell to a base station BSS or an operations support system OSS, which is corresponding to the first cell, so that the BSS or OSS obtains the un-configured neighboring cell of the first cell according to the information about the un-configured neighboring cell, and adds the un-configured neighboring cell to a neighboring cell list of the first cell.

Alternatively, the information about the un-configured neighboring cell includes information about correspondence between the second cell and a cell in the second network corresponding to the unidentified PCI, a GCI of the second cell, and the GCI corresponding to the unidentified PCI; and that so that the BSS or OSS obtains the un-configured neighboring cell of the first cell according to the information about the un-configured neighboring cell includes:

determining, by the BSS or OSS according to the GCI of the second cell, that a cell corresponding to the second cell is the first cell;

determining, according to the GCI corresponding to the unidentified PCI, a cell in the first network corresponding to the GCI;

determining whether the cell in the first network corresponding to the GCI is an un-configured neighboring cell of the first cell; and if the cell is an un-configured neighboring cell of the first cell, obtaining the cell in the first network corresponding to the GCI.

Optionally, the information about the un-configured neighboring cell includes information about correspondence between the first cell and a cell in the first network corresponding to the GCI corresponding to the unidentified PCI, and the GCI corresponding to the unidentified PCI; and that so that the BSS or OSS obtains the un-configured neighboring cell of the first cell according to the information about the un-configured neighboring cell includes:

learning, by the BSS or OSS, the cell in the first network corresponding to the GCI according to information about correspondence between the first cell and the cell in the first network corresponding to the GCI;

determining whether the cell in the first network corresponding to the GCI is an un-configured neighboring cell of the first cell; and if the cell is an un-configured neighboring cell of the first cell, obtaining the cell in the first network corresponding to the GCI.

Further, in the embodiment, the adding the un-configured neighboring cell to a neighboring cell list of the first cell includes:

obtaining the neighboring cell list of the first cell;

determining whether in the neighboring cell list there is a cell that has the same mobile short code as the un-configured neighboring cell; and if there is no such cell, adding the un-configured neighboring cell to the neighboring cell list of the first cell.

Optionally, the method according to the embodiment further includes:

if in the neighboring cell list there is a cell that has the same mobile short code as the un-configured neighboring cell, recording neighboring cell optimization information, where the neighboring cell optimization information includes the information about the un-configured neighboring cell, information of determining that there is a mobile short code conflict, and conflicting mobile short codes.

Optionally, the method according to the embodiment further includes:

if in the neighboring cell list there is a cell that has the same mobile short code as the un-configured neighboring cell, adjusting the mobile short code of the un-configured neighboring cell to be different from mobile short codes in the neighboring cell list, and adding the un-configured neighboring cell to the neighboring cell list of the first cell.

A benefit of the method embodiment provided by the present invention is that: in cases where a first network and a second network are in overlay networking, the second network is used to help the first network to detect a problem that a neighboring cell is not configured, thereby implementing automatic neighboring cell optimization for a cell in the first network, which reduces manpower costs of network optimization.

Figure 2:
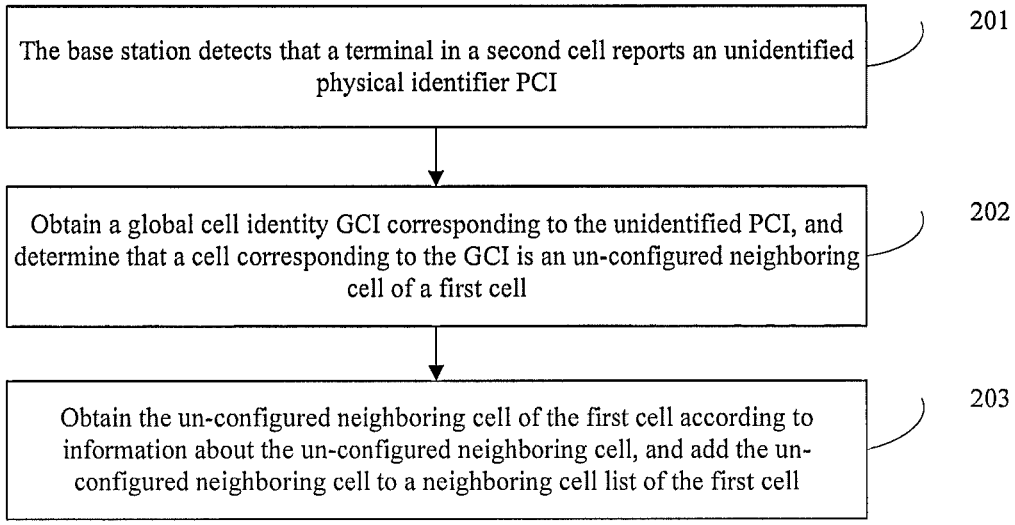
FIG. 2 is a flowchart of another method for optimizing a neighboring cell according to an embodiment of the present invention.

Referring to FIG. 2, an embodiment of the present invention provides a method for optimizing a neighboring cell, where a first network and a second network are in overlay networking, where a first cell in the first network and a second cell in the second network have a coverage area in common, and the first cell and the second cell share one base station. The method includes:

Step 201: The base station detects that a terminal in the second cell reports an unidentified physical identifier PCI;

Step 202: Obtain a global cell identity GCI corresponding to the unidentified PCI, and determine that a cell corresponding to the GCI is an un-configured neighboring cell of the first cell; and Step 203: Obtain the un-configured neighboring cell of the first cell according to information about the un-configured neighboring cell, and add the un-configured neighboring cell to a neighboring cell list of the first cell.

Alternatively, the information about the un-configured neighboring cell includes information about correspondence between the second cell and a cell in the second network corresponding to the unidentified PCI, a GCI of the second cell, and the GCI corresponding to the unidentified PCI; and the obtaining the un-configured neighboring cell of the first cell according to information about the un-configured neighboring cell includes:

determining, according to the GCI of the second cell, that the first cell corresponds to the second cell;

determining, according to the GCI corresponding to the unidentified PCI, a cell in the first network corresponding to the GCI; determining whether the cell in the first network corresponding to the GCI is an un-configured neighboring cell of the first cell; and if the cell is an un-configured neighboring cell of the first cell, obtaining the cell in the first network corresponding to the GCI.

Further, in the embodiment, optionally, the information about the un-configured neighboring cell includes information about correspondence between the first cell and a cell in the first network corresponding to the GCI of the unidentified PCI, and the GCI corresponding to the unidentified PCI; and the obtaining the un-configured neighboring cell of the first cell according to information about the un-configured neighboring cell includes:

obtaining the cell in the first network corresponding to the GCI according to the information about correspondence between the first cell and the cell in the first network corresponding to the GCI;

determining whether the cell in the first network corresponding to the GCI is an un-configured neighboring cell of the first cell; and if the cell is an un-configured neighboring cell of the first cell, obtaining the cell in the first network corresponding to the GCI.

Further, in the embodiment, the adding the un-configured neighboring cell to a neighboring cell list of the first cell includes:

obtaining the neighboring cell list of the first cell;

determining whether in the neighboring cell list there is a cell that has the same mobile short code PN as the un-configured neighboring cell; and if there is no such cell, adding the un-configured neighboring cell to the neighboring cell list of the first cell.

Alternatively, the method in the embodiment further includes:

if in the neighboring cell list there is a cell that has the same PN as the un-configured neighboring cell, recording neighboring cell optimization information, where the neighboring cell optimization information includes the information about the un-configured neighboring cell, information that a PN conflict is determined, and conflicting PNs.

Optionally, the method in the embodiment further includes:

if in the neighboring cell list there is a cell that has the same PN as the un-configured neighboring cell, adjusting the PN of the un-configured neighboring cell to be different from mobile short codes in the neighboring cell list, and adding the un-configured neighboring cell to the neighboring cell list of the first cell.

A benefit of the method embodiment provided by the present invention is that: in cases where a first network and a second network are in overlay networking, the second network is used to help the first network to detect a problem that a neighboring cell is not configured, thereby implementing automatic neighboring cell optimization for a cell in the first network, which reduces manpower costs of network optimization.

Figure 3:
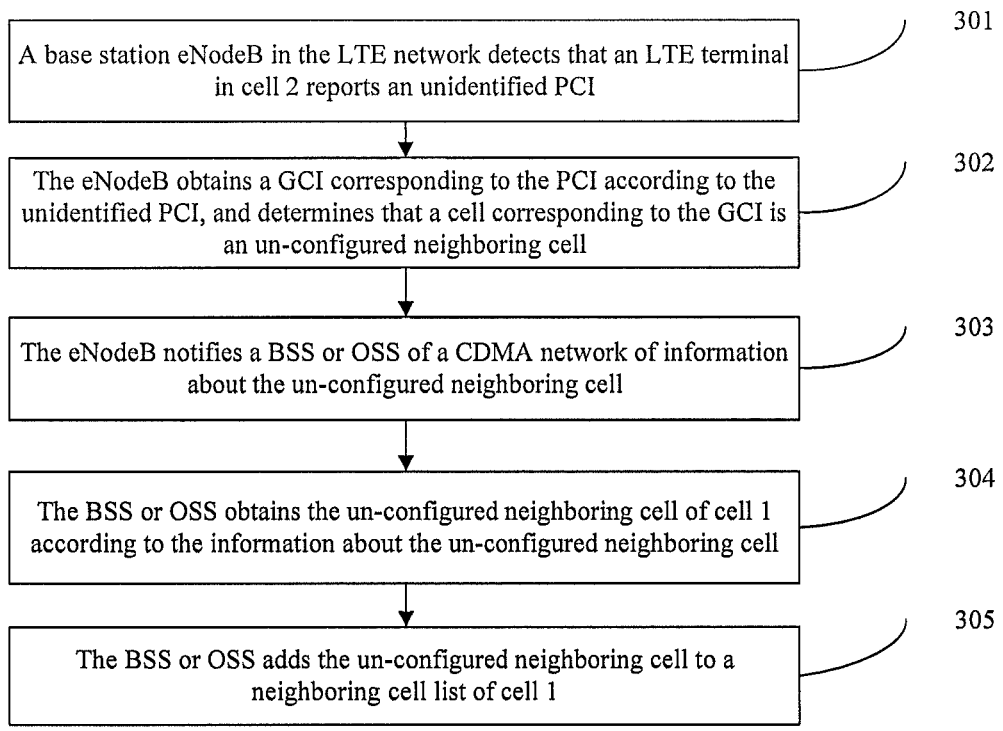
FIG. 3 is a flowchart of a method for optimizing a neighboring cell according to an embodiment of the present invention.

Referring to FIG. 3, an embodiment of the present invention provides a method for optimizing a neighboring cell, where when a first network does not support reading a cell ID of a designated PN by using a terminal, a second network may be used to obtain the cell of the designated PN, thereby implementing neighboring cell optimization for a cell in the first network. The following description uses an example where the first network is a CDMA network and a second network is an LIE network.

The CDMA network does not support reading a GCI (Global Cell Identity, global cell identity) of a designated PN by using a terminal, while the LIE network supports reading a cell ID of a designated PN by using a terminal. In the embodiment, when the LIE network and the CDMA network are in overlay networking, with help of the LIE network, neighboring cell optimization for a cell in the CDMA network can be automatically implemented. In the embodiment, it is assumed that cell 1 in the CDMA network and cell 2 in the LTE network have a coverage area in common, and a specific method includes the following steps:

Step 301: A base station eNodeB in the LIE network detects that an LTE terminal in cell 2 reports an unidentified PCI.

In the embodiment, the LIE helps the CDMA in neighboring cell optimization. When a data service is running on an LIE terminal, the eNodeB configures a measurement event for the terminal. Then, the terminal periodically measures signal strength of intra-frequency cells. If, upon measurement, there is a cell whose signal quality satisfies a report condition configured in the measurement event, the terminal reports a PCI (Physical Cell Identifier, physical cell identifier) of the unidentified cell. It is a prior art that an LTE terminal reports an unidentified PCI, which will not be described herein.

Step 302: The eNodeB obtains a GCI corresponding to the PCI according to the unidentified PCI, and determines that a cell corresponding to the GCI is an un-configured neighboring cell.

The obtaining, by the eNodeB, the GCI corresponding to the PCI according to the unidentified PCI specifically includes:

1) delivering, by the eNodeB, a query command to the LIE terminal, so that the LIE terminal queries the GCI (Global Cell Identity, global cell identity) corresponding to the PCI; and 2) receiving, by the eNodeB, the GCI corresponding to the PCI reported by the LIE terminal, where the GCI is queried by the terminal upon receiving the query command delivered by the eNodeB.

In the embodiment, the eNodeB, when receiving the unidentified PCI reported by the LTE terminal, determines that the cell corresponding to the unidentified PCI is an un-configured neighboring cell of cell 2; and the eNodeB adds the cell corresponding to the unidentified PCI to a neighboring cell list of cell 2, and delivers the query command to the LIE terminal, so that the LTE terminal queries the GCI corresponding to the PCI; and the LTE terminal reports the GCI to the eNodeB after querying the GCI. Specifically, in the embodiment, it is a prior art that the eNodeB obtains the GCI corresponding to the PCI according to the unidentified PCI and determines that the cell corresponding to the unidentified PCI is an un-configured neighboring cell, which will not be described in the embodiment.

Step 303: The eNodeB notifies a BSS or OSS of the CDMA network of information about the un-configured neighboring cell.

In the embodiment, the eNodeB, after determining that the cell corresponding to the unidentified PCI is an un-configured neighboring cell of cell 2, notifies a BSS or OSS (Operation Support System, operations support system) of the CDMA network of information about the un-configured neighboring cell, where the information about the un-configured neighboring cell may be correspondence between cell 2 and a cell in the LTE network corresponding to the unidentified PCI. That is, the eNodeB notifies the BSS or OSS of the CDMA network of the relationship between cell 2 and the cell corresponding to the unidentified PCI. Further, the information about the un-configured neighboring cell may also be correspondence between cell 1 and a cell in the CMDA network corresponding to the unidentified PCI. That is, the eNodeB, after obtaining the correspondence between cell 2 and the cell in the LIE network corresponding to the unidentified PCI, further finds the correspondence between cell 1 and the cell in the CDMA network corresponding to the unidentified PCI, and then sends the correspondence to the BSS or OSS of the CDMA network. Whichever correspondence is sent by the eNodeB to the BSS or OSS of the CDMA network, the CDMA network can finally obtain the GCI of the cell corresponding to the unidentified PCI in the CDMA network. A GCI is a unique identifier of a cell. Each cell corresponds to a unique GCI. The CDMA network may accurately determine a location of an unidentified cell by using the GCI, thereby determining whether the unidentified cell is an un-configured neighboring cell.

In the embodiment, it is assumed that cell 1 in the CDMA network and cell 2 in the LTE network have a coverage area in common. A base station (such as a BSS) of cell 1 and a base station (such as an eNodeB) of cell 2 may be the same base station, where the base station has functions of both the eNodeB and the BSS, and the base station saves both neighboring cell information of cell 1 and neighboring cell information of cell 2.

The BSS of cell 1 and the eNodeB of cell 2 may also be two different base stations, and the eNodeB and the BBS may exchange information therebetween. The BSS may receive and save neighboring cell information of cell 2 sent by the eNodeB.

When the function of the eNodeB and the function of the BSS are implemented by an integrated device, content executed in step 303 may be omitted or be completed by using internal signaling exchange of the integrated device.

Step 304: The BSS or OSS obtains the un-configured neighboring cell of cell 1 according to the information about the un-configured neighboring cell.

In the embodiment, the eNodeB, if already finding the correspondence of the correspondence between cell 1 and the cell in the CMDA network corresponding to the unidentified PCI, sends the correspondence to the BSS or OSS. In this case, the information about the un-configured neighboring cell is the correspondence between cell 1 and the cell in the CMDA network corresponding to the unidentified PCI, which is notified by the eNodeB, and the step specifically includes:

1) obtaining, by the BSS or OSS according to the correspondence between cell 1 and the cell in the CMDA network corresponding to the unidentified PCI, the cell in the CDMA network corresponding to the unidentified PCI; and 2) determining, by the BSS or OSS according to the GCI, whether the cell in the CMDA network corresponding to the unidentified PCI is an un-configured CDMA neighboring cell of cell 1; and if the cell is an un-configured CDMA neighboring cell of cell 1, obtaining the un-configured neighboring cell.

Further, in the embodiment, if the information about the un-configured neighboring cell sent by the eNodeB is the correspondence between cell 2 and a cell in the LIE network corresponding to the unidentified PCI, a GCI of cell 2, and the GCI corresponding to the unidentified PCI, the step specifically includes:

1) finding, by the BSS or OSS according to the GCI of cell 2, that a cell in the CDMA network corresponding to cell 2 is cell 1;

2) finding, by the BSS or OSS according to the GCI corresponding to the unidentified PCI, a cell in the CDMA network corresponding to the GCI; and 3) determining, by the BSS or OSS, whether the cell in the CDMA network corresponding to the GCI is an un-configured neighboring cell of cell 1.

The determining, by the BSS or OSS, whether the cell in the CDMA network corresponding to the GCI is an un-configured neighboring cell of cell 1 specifically includes: determining, by the BSS or OSS, whether the cell in the CDMA network corresponding to the GCI is an unidentified cell in the CDMA network; and if the cell is an unidentified cell in the CDMA network, determining that the cell in the CDMA network corresponding to the GCI is an un-configured neighboring cell of cell 1.

Step 305: The BSS or OSS adds the un-configured neighboring cell to a neighboring cell list of cell 1.

Further, the embodiment may specifically include:

1) obtaining, by the BSS or OSS, a neighboring cell list of cell 1; and 2) detecting, by the BSS or OSS, whether the neighboring cell list of cell 1 includes at least one cell that has the same PN as the un-configured neighboring cell; if the neighboring cell list of cell 1 includes at least one cell that has the same PN as the un-configured neighboring cell, determining that there is a PN code conflict; and if the neighboring cell list of cell 1 does not include at least one cell that has the same PN as the un-configured neighboring cell, there is no PN code conflict.

Because the PN is a physical identifier of a cell, a limited range of numbers are defined in the existing standard, and it is impossible that each cell corresponds to a unique PN identifier. Therefore, it is possible that a PN is shared. If there is no PN code conflict, the BSS or OSS may add the un-configured neighboring cell to the neighboring cell list of cell 1.

In the case of a PN code conflict, alternatively, the BSS or OSS may record information about this time of neighboring cell optimization, where the neighboring cell optimization information includes information about the un-configured neighboring cell, information that there is a PN code conflict, and conflicting PN codes, and the like; or alternatively, the BSS or OSS may automatically adjust the PN code of the un-configured neighboring cell to be a PN code different from PN codes in the neighboring cell list of cell 1, and after the PN code is adjusted, automatically add the un-configured neighboring cell to the neighboring cell list of cell 1.

A benefit of the technical solution provided by the embodiment of the present invention is that: in cases where CDMA and LTE networks are in overlay networking, the LIE network is used to help the CDMA network to detect an un-configured neighboring cell, thereby implementing automatic CDMA neighboring cell optimization, which reduces manpower costs of CDMA neighboring cell optimization. Moreover, further, neighboring cell optimization can improve a soft handoff success rate of a CDMA system and reduce a call drop rate, thereby improving network performance and user experience.

Figure 4:
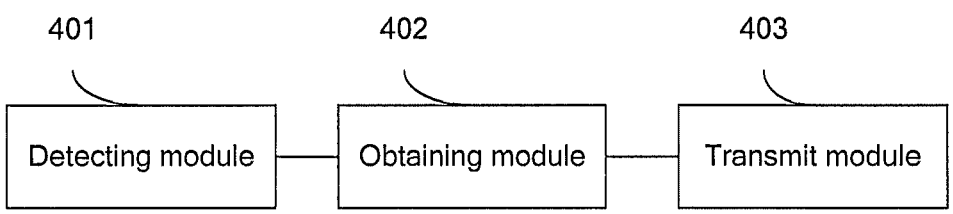
FIG. 4 is a schematic structural diagram of a base station according to an embodiment of the present invention.

Referring to FIG. 4, an embodiment of the present invention provides a base station, where a first network and a second network are in overlay networking, where a first cell in the first network and a second cell in the second network have a coverage area in common and a base station corresponding to the first cell is different from a base station corresponding to the second cell. The base station provided in this embodiment is the base station corresponding to the second cell. The base station includes a detecting module 401, an obtaining module 402, and a transmit module 403.

The detecting module 401 is configured to detect that a terminal in the second cell reports an unidentified physical identifier PCI.

The obtaining module 402 is configured to obtain a global cell identity GCI corresponding to the unidentified PCI, and determine that a cell corresponding to the GCI is an un-configured neighboring cell of the first cell.

The transmit module 403 is configured to send information about the un-configured neighboring cell to a base station subsystem BSS or an operations support system OSS, which is corresponding to the first cell, so that the BSS or OSS obtains the un-configured neighboring cell of the first cell according to the information about the un-configured neighboring cell, and adds the un-configured neighboring cell to a neighboring cell list of the first cell.

A benefit of the apparatus embodiment provided by the present invention is that: in cases where a first network and a second network are in overlay networking, the second network is used to help the first network to detect an un-configured neighboring cell, thereby implementing automatic neighboring cell optimization for a cell in the first network, which reduces manpower costs of network optimization.

Figure 5:
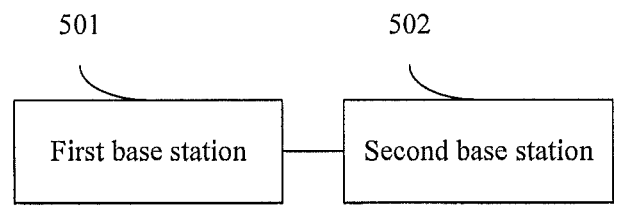
FIG. 5 is a schematic structural diagram of a system for optimizing a neighboring cell according to an embodiment of the present invention.

Referring to FIG. 5, an embodiment of the present invention provides a system for optimizing a neighboring cell, where the system includes a first base station 501 and a second base station 502; a first network and a second network are in overlay networking; a first cell in the first network and a second cell in the second network have a coverage area in common; a base station corresponding to the first cell is the first base station; and a base station corresponding to the second cell is the second base station;

the second base station 502 is configured to detect that a terminal in the second cell reports an unidentified physical identifier PCI; obtain a global cell identity GCI corresponding to the unidentified PCI, and determine that a cell corresponding to the GCI is an un-configured neighboring cell of the first cell; and send information about the un-configured neighboring cell to the first base station; and the first base station 501 is configured to receive the information about the un-configured neighboring cell sent by the second base station; obtain the un-configured neighboring cell of the first cell according to the information about the un-configured neighboring cell; and add the un-configured neighboring cell to a neighboring cell list of the first cell.

A benefit of the system embodiment provided by the present invention is that: in cases where a first network and a second network are in overlay networking, the second network is used to help the first network to detect an un-configured neighboring cell, thereby implementing automatic neighboring cell optimization for a cell in the first network, which reduces manpower costs of network optimization.

Figure 6:
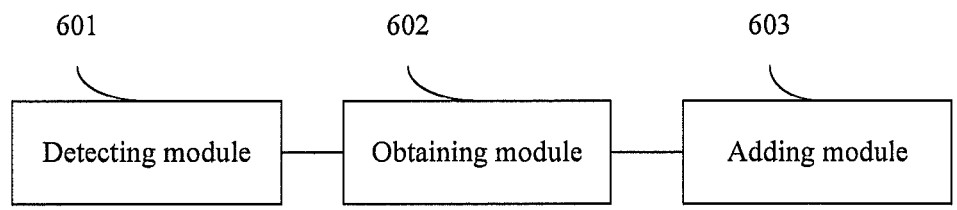
FIG. 6 is a schematic structural diagram of a base station according to an embodiment of the present invention.

Referring to FIG. 6, an embodiment of the present invention provides a base station, where a first network and a second network are in overlay networking, where a first cell in the first network and a second cell in the second network have a coverage area in common. The base station is a base station shared by the first cell and the second cell; and the base station includes a detecting module 601, an obtaining module 602, and an adding module 603.

The detecting module 601 is configured to detect that a terminal in the second cell reports an unidentified physical identifier PCI.

The obtaining module 602 is configured to obtain a global cell identity GCI corresponding to the unidentified PCI, and determine that a cell corresponding to the GCI is an un-configured neighboring cell of the first cell.

The adding module 603 is configured to obtain the un-configured neighboring cell of the first cell according to information about the un-configured neighboring cell, and add the un-configured neighboring cell to the neighboring cell list of the first cell.

Alternatively, the information about the un-configured neighboring cell includes information about correspondence between the second cell and a cell in the second network corresponding to the unidentified PCI, a GCI of the second cell, and the GCI corresponding to the unidentified PCI; and the adding module 603 is specifically configured to:

determine, according to the GCI of the second cell, that a cell corresponding to the second cell is the first cell;

determine, according to the GCI corresponding to the unidentified PCI, a cell in the first network corresponding to the GCI;

determine whether the cell in the first network corresponding to the GCI is an un-configured neighboring cell of the first cell; and if the cell is an un-configured neighboring cell of the first cell, obtain the cell in the first network corresponding to the GCI.

Alternatively, in the embodiment, the information about the un-configured neighboring cell includes corresponding relationship information between the first cell and a cell in the first network corresponding to the GCI of the unidentified PCI, and the GCI corresponding to the unidentified PCI; and the adding module 603 is specifically configured to:

obtain the cell in the first network corresponding to the GCI according to the corresponding relationship information between the first cell and the cell in the first network corresponding to the GCI;

determine whether the cell in the first network corresponding to the GCI is an un-configured neighboring cell of the first cell; and if the cell is an un-configured neighboring cell of the first cell, obtain the cell in the first network corresponding to the GCI.

A benefit of the apparatus embodiment provided by the present invention is that: in cases where a first network and a second network are in overlay networking, the second network is used to help the first network to detect an un-configured neighboring cell, thereby implementing automatic neighboring cell optimization for a cell in the first network, which reduces manpower costs of network optimization.

The embodiments of the present invention may be implemented by using software. A corresponding software program may be stored in a readable storage medium, such as a hard disk, a cache, or a compact disc of a computer.

The above are merely exemplary embodiments of the present invention and the scope of the present invention is not limited thereto. All modifications, equivalent replacements, and improvements made without departing from the spirit and principle of the present invention shall fall within the scope of the present invention.

What is claimed is:

1. A base station for optimizing a neighboring cell, with the base station corresponding to a second cell in a second network, the base station comprising:
   a processor; and
   a non-transitory computer readable medium coupled to the processor and storing thereon computer-executable instructions that when executed by the processor, configure the base station to:
      detect an unidentified physical cell identifier (PCI) reported by a terminal in the second cell;
      obtain a global cell identity (GCI) corresponding to the unidentified PCI;
      determine that the GCI corresponds to an un-configured neighboring cell of a first cell in a first network, wherein the first cell and the second cell include a coverage area in common and a first base station corresponding to the first cell is different from the base station corresponding to the second cell;
      send information about the un-configured neighboring cell to the first base station or to an operations support system (OSS) corresponding to the first cell, so that the first base station or the OSS obtains the un-configured neighboring cell of the first cell according to the information about the un-configured neighboring cell; and
      add the un-configured neighboring cell to a neighboring cell list of the first cell.

2. A system for optimizing a neighboring cell, the system comprising:
   a first cell in a first network;
   a second cell in a second network, wherein the first cell and the second cell include a coverage area in common;
   a first base station;
   a second base station corresponding to the second cell, wherein the second base station is configured to:
      detect an unidentified physical cell identifier (PCI) reported by a terminal in the second cell;
      obtain a global cell identity (GCI) corresponding to the unidentified PCI; and
      determine that the GCI corresponds to an un-configured neighboring cell of the first cell; and
      send information about the un-configured neighboring cell to the first base station; and
   the first base station corresponding to the first cell, wherein the first base station is configured to:
      receive the information about the un-configured neighboring cell sent by the second base station;
      obtain the un-configured neighboring cell of the first cell according to the information about the un-configured neighboring cell; and
      add the un-configured neighboring cell to a neighboring cell list of the first cell.

3. A base station for optimizing a neighboring cell, with the base station corresponding to a first cell in a first network and to a second cell in a second network, the base station comprising:
   a processor; and
   a non-transitory computer readable medium coupled to the processor and storing thereon computer-executable instructions that when executed by the processor, configure the base station to:
      detect an unidentified physical cell identifier (PCI) reported by a terminal in the second cell;
      obtain a global cell identity (GCI) corresponding to the unidentified PCI;
      determine that the GCI corresponds to an un-configured neighboring cell of the first cell;
      obtain the un-configured neighboring cell of the first cell according to information of the un-configured neighboring cell; and
      add the un-configured neighboring cell to a neighboring cell list of the first cell.

4. The base station according to claim 3, wherein the base station is further configured to:
   obtain a cell in the first network corresponding to the GCI; and
   determine that the cell in the first network corresponding to the GCI.

5. The base station according to claim 3, wherein the base station is further configured to:
   determine whether a cell in the first network corresponding to the GCI is an unidentified cell in the first network; and
   if the cell is an unidentified cell in the first network, determine that the cell is an un-configured neighboring cell of the first cell.

* * * * *

UNITED STATES PATENT AND TRADEMARK OFFICE
CERTIFICATE OF CORRECTION

| | | |
|---|---|---|
| PATENT NO. | : 9,143,993 B2 | Page 1 of 1 |
| APPLICATION NO. | : 14/098688 | |
| DATED | : September 22, 2015 | |
| INVENTOR(S) | : Rong Wan et al. | |

It is certified that error appears in the above-identified patent and that said Letters Patent is hereby corrected as shown below:

IN THE CLAIMS

Claim 2, Column 12, Line 16

After "PCI;" delete "and".

Claim 3, Column 12, Line 32

After "network," delete "the base station".

Signed and Sealed this
Eighth Day of December, 2015

Michelle K. Lee
*Director of the United States Patent and Trademark Office*